Figure 1:
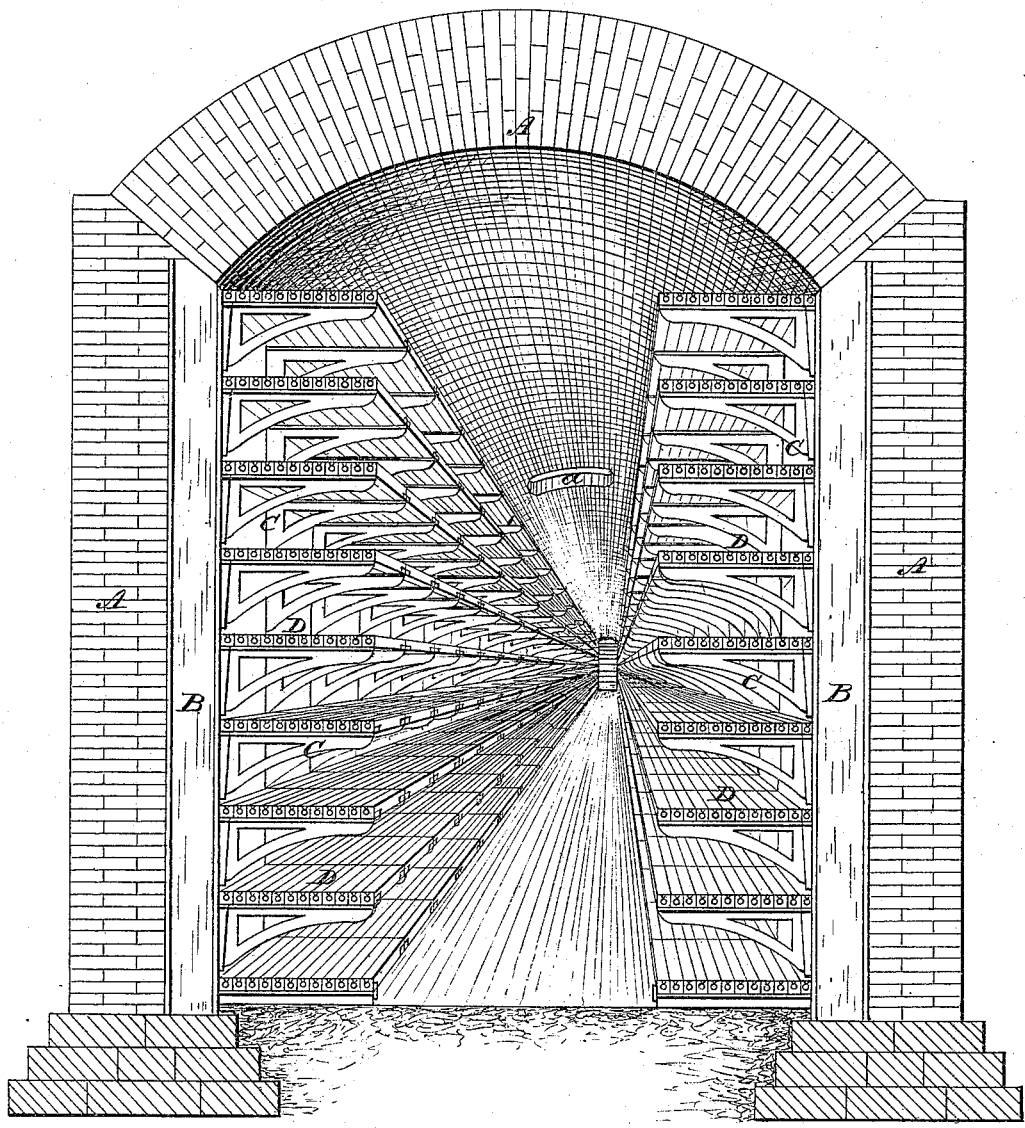

(No Model.) 2 Sheets—Sheet 1.

W. K. PLATT & G. A. ALDRICH.
ACCESSIBLE UNDERGROUND CONDUIT.

No. 309,091. Patented Dec. 9, 1884.

Witnesses:
Guy DeMott.
W. L. Clark

Inventors:
William K. Platt,
George A. Aldrich,
By J. C. Brecht,
Attorney.

(No Model.) 2 Sheets—Sheet 2.
W. K. PLATT & G. A. ALDRICH.
ACCESSIBLE UNDERGROUND CONDUIT.
No. 309,091. Patented Dec. 9, 1884.
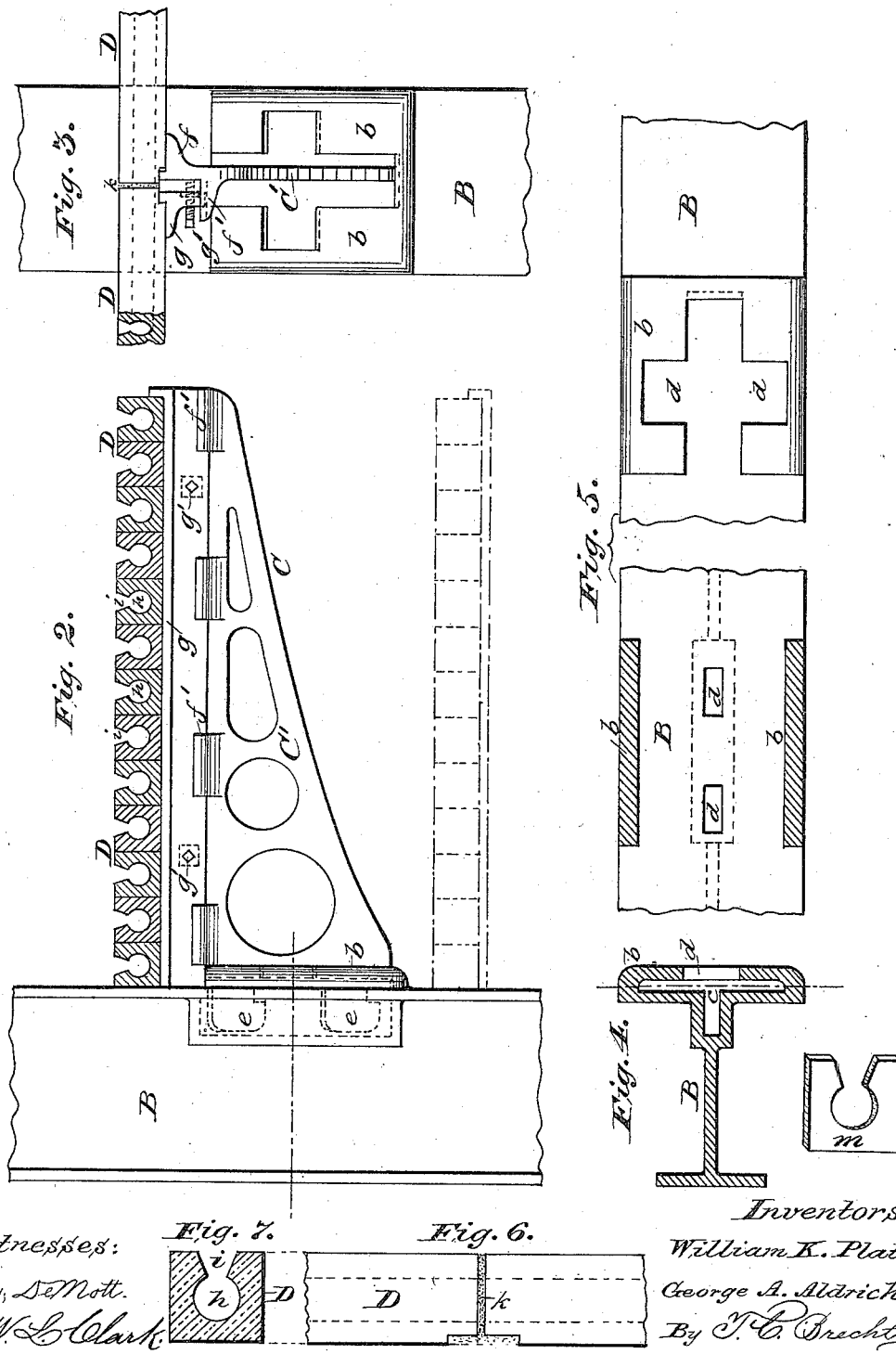

UNITED STATES PATENT OFFICE.

WILLIAM K. PLATT AND GEORGE A. ALDRICH, OF PHILADELPHIA, PENNSYLVANIA.

ACCESSIBLE UNDERGROUND CONDUIT.

SPECIFICATION forming part of Letters Patent No. 309,091, dated December 9, 1884.

Application filed February 29, 1884. (No model.)

*To all whom it may concern:*

Be it known that we, WILLIAM K. PLATT and GEORGE A. ALDRICH, both citizens of the United States, residing at Philadelphia, in the county of Philadelphia and State of Pennsylvania, have invented certain new and useful Improvements in Accessible Underground Conduits; and we do hereby declare the following to be a full, clear, and exact description of the invention, such as will enable others skilled in the art to which it appertains to make and use the same.

Our invention relates to improvements in accessible underground conduits for electric wires or cables, steam-pipes, tubes, or boxes for steam-heating or other purposes, &c.; and the object is to produce an underground conduit in which electric wires or cables, steam-pipes, tubes, or boxes are arranged on brackets placed one above the other, so as to form shelves, upon which are placed a series of glass tubes or block with aperture to admit of access to the wires, cables, pipes, &c., so that any one of them can be easily reached without disturbing the others. At the same time the wires, pipes, &c., are retained in their places properly.

The invention consists of a conduit constructed of brick, stone, or other material, arranged under the surface of the ground, and made large enough, so that operators can move about freely in it and gain access to any part therein. In this conduit are arranged a series of columns supporting adjustable brackets, upon which the tubes or blocks, made of glass, earthenware, or other suitable material, are supported, so as to be readily accessible. Said tubes or blocks are provided with apertures to admit the wires, pipes, &c., and yet prevent them from easily leaving their positions in them. It also consists in certain details of construction, all of which will be more fully described hereinafter, and more specifically pointed out in the claims, reference being had to the accompanying drawings and the letters of reference marked thereon.

Like letters indicate like parts in the different figures of the drawings, in which Figure 1 represents a perspective view of the conduit, with the shelves, &c., in position. Fig. 2 is an enlarged side view of one of the brackets, with the post for supporting it. Fig. 3 is an enlarged front view of the same. Fig. 4 is a cross-section on line $x\ x$ of Fig. 1. Fig. 5 represents detail views of one of the posts. Fig. 6 is an enlarged detail view of one of the glass tubes for holding the wire, &c. Fig. 7 is a cross-section of the same.

In the accompanying drawings, A represents the conduit, made of brick, stone, or other suitable material, and is made large enough, so that operators or workmen can freely move around in it. It is to be made water-tight, and at intervals are arranged suitable light and air holes, $a$, which may be provided with gratings or doors. In the sides of this conduit a series of posts or columns, B, are securely built, and preferably of the cross-section shown in Fig. 4. The inner ends of these posts are provided with a series of projections, $b$, cast with a series of T-shaped recesses, $c$, and two openings, $d$, through which two hook-shaped lugs, $e$, on the brackets C are inserted and hold these in position. The brackets are preferably made of the form shown in Figs. 2 and 3. They have a web, C′, which is provided on each side with lugs $f$, one of which supports one end of the glass tubes or boxes D, while the other, $f'$, supports a lug, $g$, which is made adjustable by a screw, $g'$, so as to compensate for different lengths of the glass tubes, &c. The tubes or boxes D are cast or blown of glass or other vitreous material, or they may be made of earthenware, concrete, baked clay, or any other suitable material. They are provided with a tubular passage, $h$, which has a slot, $i$, through which the wires, &c., can be inserted. The joints between the ends of the tubes are connected by wax, paraffine, cement, or suitable pliable compositions, and are made as shown at $k$ in Fig. 6. The slots $i$ are also sealed or closed by wax, paraffine, cement, or other suitable compositions. These blocks or tubes may be made of any size required for the different purposes for which they are intended. The conduits can also be made of any desired size to suit the size of the city or the purposes for which they are intended. At proper intervals in the line of the conduit are arranged doors to gain access thereto in case of repairs required, or if additional wires, pipes, &c., are to be added at any time. A washer, m, of paraffine and cotton combined, is placed between the ends of the tubes or boxes D, to form a joint, if desired.

It will be readily seen by those skilled in the art that this conduit, with its arrangement of shelves or brackets for supporting the tubes or boxes containing the wires, &c., forms a very easily accessible and convenient invention; and, if desired, the wires, &c., can be sealed up, so as not to be influenced by variations of the temperature of the atmosphere, and will also prevent tampering by any one excepting those having the proper authority. It forms a compact arrangement for a large number of wires, pipes, &c., and any kind of wires—such as telegraph, telephone, electric-light, and any other wires—can be easily and quickly laid or repaired. The washers are pliable and yet water-tight.

Having thus described our invention, what we claim, and desire to secure by Letters Patent, is—

1. An adjustable bracket provided with lugs for supporting the ends of tubes, blocks, or pipes containing electric wires, steam-pipes, &c., and having an adjustable detachable lug, g, arranged substantially as and for the purpose specified.

2. An adjustable bracket provided with hooked lugs e, for supporting the ends of tubes, blocks, or pipes containing electric wires, steam-pipes, &c., and attached to posts or columns, as shown and set forth.

3. In an accessible underground conduit for electric wires, &c., the combination of posts or columns B, provided with a series of recesses, c, having openings d, for the reception of the hooked lugs e on the brackets C, with the tubes D, all substantially as specified.

4. The combination of the posts or columns B and the brackets C, having hooked lugs e, with the tubes D, provided with a tubular passage, h, and a slot, i, and all constructed and arranged substantially as specified.

5. The combination of a series of wires or cables arranged in boxes D, placed on brackets C, having hooked ends e, with a series of recessed posts or columns, B, secured in the walls of the conduit, and all constructed substantially as shown and specified.

In testimony whereof we affix our signatures in presence of two witnesses.

WILLIAM K. PLATT. [L. S.]
GEORGE A. ALDRICH. [L. S.]

Witnesses:
 GUY DeMOTT,
 WM. L. CLARK.